United States Patent Office 2,821,540
Patented Jan. 28, 1958

2,821,540

PREPARATION OF HINDERED 4-ACYLAMIDO-
BENZOATES

Merrill E. Speeter and John A. Hogg, Kalamazoo Township, Kalamazoo County, Mich., assignors to The Upjohn Company, Kalamazoo, Mich., a corporation of Michigan No Drawing. Application July 14, 1954
Serial No. 443,441

7 Claims. (Cl. 260—471)

This invention relates to a chemical process and more particularly to a novel process for the preparation of hindered 4-acylamidobenzoic acid compounds which for the most part can be represented by the formula:

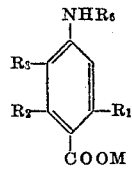

wherein $R_1$ is a member selected from the group consisting of hydrogen and alkyl, cycloalkyl, aralkyl, aryl, and heterocyclic radicals; $R_2$ is a member selected from the group consisting of alkyl and aryl radicals; $R_3$ is a member selected from the group consisting of hydrogen and alkyl and aralkyl radicals; M is a member selected from the group consisting of hydrogen and alkyl and aralkyl radicals; and $R_6$ is an acyl radical.

Esters of 4-aminobenzoic acid are known to have valuable therapeutic properties, especially as local anesthetics. Thus, β-diethylaminoethyl 4-aminobenzoate, commonly known as procaine, is particularly useful as a local anesthetic. These esters, however, have the disadvantage of being relatively easily hydrolyzed. It has been found that this disadvantage is largely avoided if the carboxylate group is hindered, i. e., if at least one of the carbon atoms ortho to the carboxylate group in the 1-position bears a substituent such as $R_1$ or $R_2$, as set forth in greater detail hereinafter. Thus, 2,6-dimethylprocaine, for example, is more stable to hydrolysis than procaine. This and other hindered 4-aminobenzoic acid derivatives, however, cannot be prepared by the methods known for the preparation of procaine.

However, by the novel procedure of the invention, hindered 4-acylamidobenzoic acid compounds are obtained by a method hitherto unavailable and these compounds are then converted to the above-mentioned therapeutically useful hindered procaine compounds.

It is an object of the invention, therefore, to provide a new and novel process for the preparation of hindered 4-acylamidobenzoic acid compounds. Other objects and features of the invention will be apparent to those skilled in the art to which this invention pertains.

These objects are accomplished in the present invention by subjecting a hindered 4-oxo-2-cyclohexene-1-carboxylic acid ester to azination and subjecting the resulting azine of a hindered 4-oxo-2-cyclohexene-1-carboxylic acid ester to aromatization, followed by hydrolysis and acylation to form a hindered 4-acylamidobenzoic acid. This procedure can be advantageously modified by subjecting the aromatized compound, i. e., the hindered 4-aminobenzoic acid ester, to acylation to form the corresponding hindered 4-acylamidobenzoic acid ester followed by hydrolysis and acylation of this compound to form a hindered 4-acylamidobenzoic acid. By the first acylation, the 4-acylamidobenzoic acid ester is readily isolated and purified. The hindered 4-acylamidobenzoic acid can be converted to hindered 4-aminobenzoic acid derivatives possessing therapeutic activity, especially local anesthetic activity, by a series of steps wherein the hindered 4-acylamidobenzoic acid is reacted with an inorganic acid halide to obtain a hindered 4-acylamidobenzoyl halide, which is then reacted with a secondary-amino alkanol to obtain a hindered secondary aminoalkyl 4-acylamidobenzoic acid ester. This compound is then deacylated to form the corresponding therapeutically active hindered secondary aminoalkyl 4-aminobenzoic acid ester, e. g., hindered procaine compound.

The steps in the preparation of hindered 4-acylamidobenzoic acid compounds according to the invention, and the subsequent conversion of these compounds to hindered 4-aminobenzoic acid compounds are set forth in the following equations:

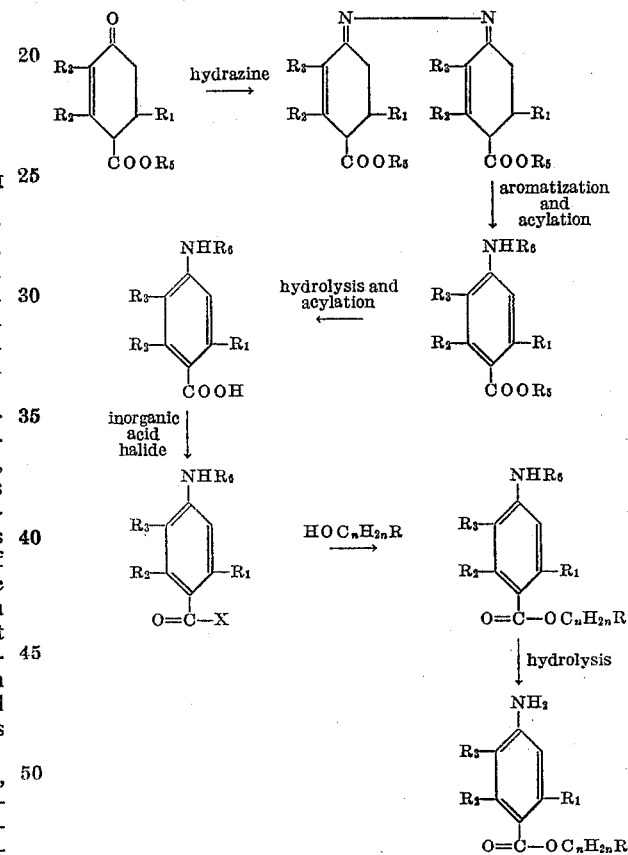

wherein $n$ is an integer from one to six inclusive; R is a secondary-amino radical, that is, a radical obtained by removing the hydrogen atom attached to the nitrogen atom of a secondary amine; $R_1$ is a member selected from the group consisting of hydrogen and alkyl, cycloalkyl, aralkyl, aryl, and heterocyclic radicals; $R_2$ is a member selected from the group consisting of alkyl and aryl radicals; $R_3$ is a member selected from the group consisting of hydrogen and alkyl and aralkyl radicals; $R_5$ is a member selected from the group consisting of alkyl and aralkyl radicals; $R_6$ is an acyl radical; and X is halogen.

Examples of alkyl radicals are methyl, ethyl, propyl, butyl, amyl, hexyl, heptyl, octyl, and the like, including isomeric forms thereof. Cycloalkyl radicals include unsubstituted and substituted radicals such as cyclopropyl, cyclobutyl, cyclopentyl, cyclohexyl, cycloheptyl, cyclooctyl, methylcyclohexyl, dimethylcyclohexyl, ethylcyclohexyl, amylcyclohexyl, hexylcyclohexyl, methylcyclobutyl, methylcylcopentyl, methylcyclooctyl, and the like including isomeric forms thereof. Aralkyl radicals include unsubstituted and substituted radicals such as benzyl, phenethyl, phenylpropyl, methoxyphenethyl, and the like, including isomeric forms thereof. Aryl radicals include unsubstituted and substituted radicals such as phenyl, naphthyl, methoxyphenyl, butoxyphenyl, methoxynaphthyl, chlorophenyl, bromonaphthyl, tolyl, xylyl, trimethylphenyl, ethylphenyl, amylphenyl, methylbutylphenyl, methylnaphthyl, butylnaphthyl, di- and trimethylnaphthyl, dichlorophenyl, dimethoxyphenyl, methoxychlorophenyl, and the like, including isomeric forms thereof. Examples of heterocyclic radicals are furyl, thienyl, pyridyl, and the like, including isomeric forms thereof. Examples of acyl radicals are acetyl, propionyl, butyryl, tosyl, benzenesulfonyl, benzoyl, and the like, including isomeric forms thereof. Examples of halogens are chlorine and bromine.

In accordance with a specific embodiment of the process of the invention, a hindered 4-oxo-2-cyclohexene-1-carboxylic acid ester is converted to its azine by any suitable procedure. Ordinarily, this is conveniently accomplished by reacting the starting keto compound with hydrazine or an acid addition salt thereof, e. g., hydrazine hydrochloride, hydrazine sulfate, and the like, in a suitable inert solvent, e. g., a lower-aliphatic alcohol such as ethanol, methanol, isopropanol, and the like, to form the corresponding hindered 4-azine ester. Where a hydrazine acid addition salt is used, a stoichiometric amount of an alkali is added to the mixture prior to reflux. Ordinarily, the molar ratio of hydrazine to starting keto compound is at least about 1:2 although a slight excess of the hydrazine is generally preferred such as a molar ratio of about 1.4:2. It is ordinarily preferred to maintain the reaction temperature at or about the boiling point of the mixture, ordinarily between about 65 and 150 degrees centigrade, depending on the specific solvent utilized. The reaction mixture is heated for periods of time varying between about one and about 24 hours depending upon such variables as reaction temperature, reactants employed, and the like, as is readily apparent to one skilled in the art. To speed up the reaction, a catalytic amount of a concentrated mineral acid such as hydrochloric acid, sulfuric acid, and the like, is added to the reaction mixture, e. g., one to three drops of such acid for a one-half mole run as is specifically indicated in Example 1. Upon completion of the reaction, the mixture is worked up by any convenient procedure. Advantageously, the reaction product, i. e., the azine of the hindered 4-oxo-2-cyclohexene-1-carboxylic acid ester, is recovered and recrystallized from a suitable solvent.

The azine of the hindered 4-oxo-2-cyclohexene-1-carboxylic acid ester is aromatized and then acylated to form the corresponding hindered 4-acylamidobenzoic acid ester. This is preferably accomplished by dissolving the azine in an inert solvent having a boiling point of at least about 180 degrees centigrade at atmospheric pressure, such as an aromatic hydrocarbon, e. g., triethylbenzene, cymene, α- and β-methylnaphthalenes, and the like, and then aromatizing the azine by reaction with a suitable aromatizing agent such as a suspended palladium catalyst and more specifically, palladium on charcoal, palladium on barium carbonate, and the like. It is ordinarily preferred to maintain the temperature of the reaction mixture between about 175 degrees centigrade and about 250 degrees centigrade for a period of at least about thirty minutes up to about six hours.

Upon completion of the aromatization reaction, the reaction product is then treated with an acylating agent such as an anhydride or a halide of a lower-aliphatic acid such as an acetic anhydride, acetyl chloride, acetyl bromide, propionyl chloride, propionic anhydride, butyric anhydride, butyryl chloride, isobutyric anhydride, caproic anhydride, caproyl chloride, heptanoic anhydride, and the like; an arylsulfonyl halide such as tosyl chloride (p-toluenesulfonyl chloride), tosyl bromide (p-toluenesulfonyl bromide), benzenesulfonyl chloride, and the like; or an aroyl halide such as benzoyl chloride, benzoyl bromide, and the like. The reaction mixture is then worked up by any convenient procedure; for example, the mixture is poured, while stirring, onto ice, and the resulting solid is then recovered and recrystallized from a suitable solvent.

The starting materials of the invention, i. e., esters of hindered 4-oxo-2-cyclohexene-1-carboxylic acids, are represented by the following formula:

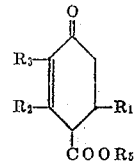

wherein $R_1$, $R_2$, $R_3$ and $R_5$ are as defined above, and include, for example:

Methyl, ethyl, n-propyl, isopropyl, n-butyl, sec-butyl, n-amyl, 1-ethylbutyl, benzyl, and phenethyl 2-methyl-4-oxo-2-cyclohexene-1-carboxylates, Ethyl 2-ethyl-4-oxo-2-cyclohexene-1-carboxylate, Methyl 2-n-propyl-4-oxo-2-cyclohexene-1-carboxylate, Methyl, benzyl, and phenethyl 2,6-dimethyl-4-oxo-2-cyclohexene-1-carboxylates, Methyl, ethyl, benzyl, and phenethyl 2-methyl-6-ethyl-4-oxo-2-cyclohexene-1-carboxylates, Methyl, ethyl, and benzyl 2-methyl-6-isopropyl-4-oxo-2-cyclohexene-1-carboxylates, Methyl, ethyl, and benzyl 2,6-diethyl-4-oxo-2-cyclohexene-1-carboxylates, Ethyl 2-methyl-6-n-hexyl-4-oxo-2-cyclohexene-1-carboxylate, Ethyl 2 - methyl - 6 - phenyl - 4 - oxo - 2 - cyclohexene-1 - carboxylate, Ethyl 2 - methyl - 6 - (2 - furyl) - 4 - oxo - 2 - cyclohexene - 1 - carboxylate, Ethyl 2 - methyl - 6 - cyclobutyl - 4 - oxo - 2 - cyclohexene - 1 - carboxylate, Methyl 2 - methyl - 6 - cyclohexyl - 4 - oxo - 2 - cyclohexene - 1 - carboxylate, Ethyl 2 - methyl - 6 - o - methylbenzyl - 4- oxo - 2 - cyclohexene - 1 - carboxylate, Ethyl 2 - methyl - 6 - methoxyphenethyl - 4 - oxo - 2-cyclohexene - 1 - carboxylate, Ethyl 2,6 - diphenyl - 4- oxo - 2 - cyclohexene - 1 - carboxylate, Ethyl 2,6 - diphenyl - 3 - ethyl - 4 - oxo - 2 - cyclohexene-1 - carboxylate, Ethyl 2,3 - dimethyl - 4 - oxo - 2 - cyclohexene - 1 - carboxylate, Ethyl 2 - methyl - 3 - benzyl - 6 - isopropyl - 4 - oxo - 2-cyclohexene - 1 - carboxylate, Methyl 2,3,6 - trimethyl - 4 - oxo - 2 - cyclohexene - 1-carboxylate, Ethyl 2 - methyl - 3 -ethyl - 4 -oxo - 2 - cyclohexene - 1-carboxylate, Ethyl 2 - methyl - 3 - (3,7 - dimethyloctyl) - 4 - oxo - 2-cyclohexene - 1 - carboxylate, Ethyl 2 - methyl - 3 - m - methoxyphenethyl - 4 - oxo - 2-cyclohexene - 1 - carboxylate, Ethyl 2 - methyl - 3 - ethyl - 6 - isopropyl - 4 - oxo - 2-cyclohexene - 1 - carboxylate, Ethyl 2 - ethyl - 3 - methyl - 4 - oxo - 2 - cyclohexene - 1-carboxylate, Ethyl 2 - methyl - 6 - p - tolyl - 4 - oxo - 2 - cyclohexene-1 - carboxylate, Ethyl 2 - methyl - 6 - benzyl - 4 - oxo - 2 - cyclohexene-1 - carboxylate, Ethyl 2 - methyl - 3 - benzyl - 4 - oxo - 2 - cyclohexene-1 - carboxylate, and the like.

The esters of hindered 4-oxo-2-cyclohexene-1-carboxylic acids which are used as starting materials in the process of the invention are perpared by various known methods.

For example, in one method, Knoevenagel condensation conditions are employed to react aldehydes (e. g., formaldehyde, acetaldehyde, phenylacetaldehyde, isobutyraldehyde, furfuraldehyde, hexahydrobenzaldehyde, and the like) with esters of β-keto alkanoic acids (e. g., ethyl acetoacetate, butyl acetoacetate, methyl acetoacetate, benzyl acetoacetate, ethyl propionylacetate, ethyl isobutyrylacetate, and the like) to form esters of α,α'-diacylglutaric acids. These "bis-esters," so-called, are then cyclized in various ways, e. g., with sulfuric acid and acetic acid, to produce esters of hindered 4-oxo-2-cyclohexene-1-carboxylic acids. This general method for preparing compounds of this type has been described in the literature by Hagemann, Ber. 26, 876 (1893); Horning, Denekas and Field, J. Org. Chem. 9, 547–551 (1944); Horning, Denekas and Field, Org. Syntheses 27, 24–27 (1947); L. I. Smith and Rouault, J. Am. Chem. Soc. 65, 631–635 (1943); and W. T. Smith and Eftax, ibid. 75, 4356 (1953).

More specifically, on reacting formaldehyde with ethyl acetoacetate, ethyl 2-methyl-4-oxo-2-cyclohexene-1-carboxylate ("Hagemann's ester") is obtained; using acetaldehyde and ethyl propionylacetate as reactants, ethyl 2-ethyl-3,6-dimethyl-4-oxo-2-cyclohexene-1-carboxylate is obtained.

Similarly, other hindered 4-oxo-2-cyclohexene-1-carboxylic acid esters are obtained such as:

Ethyl 2,6-dimethyl-4-oxo-2-cyclohexene-1-carboxylate,
Ethyl 2-methyl-6-ethyl-4-oxo-2-cyclohexene-1-carboxylate,
Ethyl 2-methyl-6-n-hexyl-4-oxo-2-cyclohexene-1-carboxylate,
Ethyl 2-methyl-6-isopropyl-4-oxo-2-cyclohexene-1-carboxylate,
Ethyl 2-methyl-6-n-propyl-4-oxo-2-cyclohexene-1-carboxylate,
Ethyl 2-methyl-6-p-methoxyphenethyl-4-oxo-2-cyclohexene-1-carboxylate,
Ethyl 2,6-diethyl-4-oxo-2-cyclohexene-1-carboxylate,
Benzyl 2,6-diethyl-4-oxo-2-cyclohexene-1-carboxylate,
Phenethyl 2,6-dimethyl-4-oxo-2-cyclohexene-1-carboxylate,
Ethyl 2-methyl-6-(2-furyl)-4-oxo-2-cyclohexene-1-carboxylate,
Ethyl 2-methyl-6-cyclohexyl-4-oxo-2-cyclohexene-1-carboxylate,
Methyl 2-methyl-6-cyclohexyl-4-oxo-2-cyclohexene-1-carboxylate,
Ethyl 2-methyl-6-o-methylbenzyl-4-oxo-2-cyclohexene-1-carboxylate,
Butyl 2-methyl-6-benzyl-4-oxo-2-cyclohexene-1-carboxylate, and the like.

Newman and Lloyd, J. Org. Chem. 17, 577-580 (1952), utilized the diene syntheses to react 2-methoxybutadiene with ethyl 2-butynoate to produce a cyclic enol ether which was readily converted by mild hydrolysis to Hagemann's ester. Similarly, starting compounds of the present invention can likewise be prepared by this method merely by using other 2-alkynoic acid esters as reactants to obtain compounds such as ethyl 2-ethyl-4-oxo-2-cyclohexene-1-carboxylate, ethyl 2-n-butyl-4-oxo-2-cyclohexene-1-carboxylate, and the like.

To prepare esters of hindered 4-oxo-2-cyclohexene-1-carboxylic acids having aryl substituents, it is ordinarily preferred to employ procedures such as those described by Rabe and Spence, Ann. 342, 352 (1905); Dieckmann and von Fischer, Ber. 44, 966–974 (1911); Dieckmann, ibid. 44, 975–981 (1911); and Horning and Field, J. Am. Chem. Soc. 68, 387–389 (946).

Thus, by these general procedures, esters of hindered 4-oxo-2-cyclohexene-1-carboxylic acids are obtained such as:

Ethyl 2-methyl-6-p-methoxyphenyl-4-oxo-2-cyclohexene-1-carboxylate,
Ethyl 2-methyl-6-phenyl-4-oxo-2-cyclohexene-1-carboxylate,
Ethyl 2,6-diphenyl-4-oxo-2-cyclohexene-1-carboxylate,
Ethyl 2-methyl-6-p-tolyl-4-oxo-2-cyclohexene-1-carboxylate, and the like.

The esters of hindered 4-oxo-2-cyclohexene-1-carboxylic acids, the starting compounds for the process of the invention, wherein $R_3$ is hydrogen (Formula II supra), are alkylated at position 3 to obtain corresponding compounds in which $R_3$ is an alkyl or aralkyl radical. Thus, for example, Hagemann's ester can be converted to ethyl 2-methyl-3-p-methoxyphenethyl-4-oxo-2-cyclohexene-1-carboxylate and ethyl 2,6-dimethyl-4-oxo-2-cyclohexene-1-carboxylate can be converted to ethyl 2,6-dimethyl-3-n-butyl-4-oxo-2-cyclohexene-1-carboxylate. Suitable alkylation procedures have been disclosed by Smith and Rouault, supra; Bergmann and Weizmann, J. Org. Chem. 4, 266–269 (1939); Horning, Horning and Platt, J. Am. Chem. Soc. 71, 1771–1773 (1949); Horning, Horning and Walker, ibid. 71, 169–171 (1949); Hogg, ibid. 70, 161–164 (1948); Dieckmann, Ber. 45, 2701 (1912); and U. S. Patent 2,582,252.

Thus, by these general procedures, other esters of hindered 4-oxo-2-cyclohexene-1-carboxylic acids are obtained such as:

Ethyl 2-methyl-3-(3,7-dimethyloctyl)-4-oxo-2-cyclohexene-1-carboxylate,
Ethyl 2,3-dimethyl-4-oxo-2-cyclohexene-1-carboxylate,
Ethyl 2-methyl-3-ethyl-4-oxo-2-cyclohexene-1-carboxylate,
Ethyl 2-methyl-3-m-methoxyphenethyl-4-oxo-2-cyclohexene-1-carboxylate,
Ethyl 2,6-dimethyl-3-ethyl-4-oxo-2-cyclohexene-1-carboxylate,
Ethyl 2-methyl-3-ethyl-6-isopropyl-4-oxo-2-cyclohexene-1-carboxylate,
Ethyl 2-methyl-3-phenethyl-6-isopropyl-4-oxo-2-cyclohexene-1-carboxylate,
Methyl 2,3,6-trimethyl-4-oxo-2-cyclohexene-1-carboxylate,
Ethyl 2-ethyl-3-methyl-4-oxo-2-cyclohexene-1-carboxylate,
Ethyl 2-methyl-3-benzyl-4-oxo-2-cyclohexene-1-carboxylate, and the like.

The following examples illustrate the process of the invention but these examples are illustrative only and are not to be construed as limiting.

*Example 1.—Azine of ethyl 2,6-dimethyl-4-oxo-2-cyclohexene-1-carboxylate*

To a solution of 98 grams (0.5 mole) of ethyl 2,6-dimethyl-4-oxo-2-cyclohexene-1-carboxylate in 100 milliliters of ethanol is added twenty grams (0.35 mole) of 85 percent hydrazine hydrate. After the addition of two drops of concentrated hydrochloric acid, the mixture is refluxed for six hours. The alcohol is removed by distillation and the resulting oil is dissolved in ether. The ether solution is extracted with a five percent hydrochloric acid solution and the extracts are made basic. The oily material thus obtained is extracted with ether, the solution dried, and the ether removed by distillation. On vacuum distillation of the residue, there is obtained the desired product, boiling between 220 and 226 degrees centigrade at 0.9 millimeter of mercury pressure; some decomposition is noted. The distillate partially crystallizes; the oily phase is separated from the solid phase by dissolving the former in methylcyclohexane. After recrystallization of the solid from methylcyclohexane, the azine of ethyl 2,6-dimethyl-4-oxo-2-cyclohexene-1-carboxylate is obtained melting between 122 and 124 degrees centigrade.

*Analysis.*—Calc. for $C_{22}H_{32}N_2O_4$: C, 68.01; H, 8.30; N, 7.21. Found: C, 68.33; H, 8.20; N, 7.60.

*Example 2.—Azine of ethyl 2-methyl-6-ethyl-4-oxo-2-cyclohexene-1-carboxylate*

Following the procedure described in Example 1 except for the substitution of ethyl 2,6-dimethyl-4-oxo-2-cyclohexene-1-carboxylate by ethyl 2-methyl-6-ethyl-4-oxo-2-cyclohexene-1-carboxylate, the azine of ethyl 2-methyl-6-ethyl-4-oxo-2-cyclohexene-1-carboxylate is obtained.

*Example 3.—Azine of ethyl 2-methyl-6-isopropyl-4-oxo-2-cyclohexene-1-carboxylate*

Following the procedure described in Example 1 except for the replacement of ethyl 2,6-dimethyl-4-oxo-2-cyclohexene-1-carboxylate by ethyl 2-methyl-6-isopropyl-4-oxo-2-cyclohexene-1- carboxylate, the azine of ethyl 2-methyl-6-isopropyl-4-oxo-2-cyclohexene-1-carboxylate is obtained.

Similarly, on replacing ethyl 2,6-dimethyl-4-oxo-2-cyclohexene-1-carboxylate in Example 1 by other hindered 4-oxo-2-cyclohexene-1-carboxylic acid esters, other azines of hindered 4-oxo-2-cyclohexene-1-carboxylic acid esters are obtained. Thus, for example, using ethyl 2-methyl-4-oxo-2-cyclohexene-1-carboxylate as the starting material, the azine of ethyl 2-methyl-4-oxo-2-cyclohexene-1-carboxylate is obtained; the azine of ethyl 2-ethyl-3,6-dimethyl-4-oxo-2-cyclohexene-1-carboxylate is obtained from ethyl 2-ethyl-3,6-dimethyl-4-oxo-2-cyclohexene-1-carboxylate; the azine of benzyl 2,6-diethyl-4-oxo-2-cyclohexene-1-carboxylate is obtained from benzyl 2,6-diethyl-4-oxo-2-cyclohexene-1-carboxylate; the azine of ethyl 2-methyl-6-(2-furyl)-4-oxo-2-cyclohexene-1-carboxylate is obtained from ethyl 2-methyl-6-(2-furyl)-4-oxo-2-cyclohexene-1-carboxylate; the azine of ethyl 2-methyl-6-cyclohexyl-4-oxo-2-cyclohexene-1-carboxylate is obtained from ethyl 2 - methyl-6-cyclohexyl-4-oxo-2-cyclohexene-1-carboxylate; the azine of ethyl 2-methyl-6-p-methoxyphenethyl-4-oxo-2-cyclohexene-1-carboxylate is obtained from ethyl 2 - methyl-6-p-methoxyphenethyl-4-oxo - 2 - cyclohexene-1-carboxylate; the azine of ethyl 2,6-diphenyl-4-oxo-2-cyclohexene-1-carboxylate is obtained from ethyl 2,6-diphenyl-4-oxo-2-cyclohexene-1-carboxylate; and the azine of ethyl 2-methyl-3-p-methoxybenzenyl-4-oxo-2-cyclohexene-1-carboxylate is obtained from ethyl 2-methyl-3-p-methoxybenzyl-4-oxo-2-cyclohexene - 1 - carboxylate.

Similarly, using the procedure set forth in Example 1 except for the replacement of ethyl 2,6-dimethyl-4-oxo-2-cyclohexene-1-carboxylate by other hindered 4-oxo-2-cyclohexene-1-carboxylic acid esters, other azines of hindered 4-oxo-2-cyclohexene-1-carboxylic acid esters are prepared such as:

The azine of phenethyl 2,6-dimethyl-4-oxo-2-cyclohexene-1-carboxylate,

The azine of butyl 2-methyl-6-benzyl-4-oxo-2-cyclohexene-1-carboxylate,

The azine of ethyl 2-methyl-3-(3,7-dimethyloctyl)-4-oxo-2-cyclohexene-1-carboxylate, The azine of ethyl 2,6-diethyl-4-oxo-2-cyclohexene-1-carboxylate, The azine of ethyl 2-methyl-3-m-methoxyphenethyl-4-oxo-2-cyclohexene-1-carboxylate, The azine of ethyl 2-methyl-6-n-hexyl-4-oxo-2-cyclohexene-1-carboxylate, The azine of ethyl 2-n-butyl-4-oxo-2-cyclohexene-1-carboxylate, The azine of ethyl 2-methyl-6-o-methylbenzyl-4-oxo-2-cyclohexene-1-carboxylate, The azine of ethyl 2-methyl-6-p-methoxyphenethyl -4-oxo-2-cyclohexene-1-carboxylate, The azine of ethyl 2,6-dimethyl-3-ethyl-4-oxo-2-cyclohexene-1-carboxylate, The azine of ethyl 2-methyl-3-benzyl-6-isopropyl-4-oxo-2-cyclohexene-1-carboxylate, The azine of ethyl 2-ethyl-4-oxo-2-cyclohexene-1-carboxylate, The azine of ethyl 2-methyl-6-p-tolyl-4-oxo-2-cyclohexene-1-carboxylate, The azine of ethyl 2,3-dimethyl-4-oxo-2-cyclohexene-1-carboxylate, and the like.

*Example 4.—Ethyl 2,6-dimethyl-4-acetamidobenzoate*

Nine grams (0.02 mole) of crude (undistilled) azine of ethyl 2,6-dimethyl-4-oxo-2-cyclohexene-1-carboxylate (Example 1) is dissolved in fifty milliliters of commercial triethylbenzene. To this solution is added one gram of ten percent palladium on charcoal and the mixture is then refluxed for 45 minutes. The reaction mixture is cooled, filtered to remove the solid catalyst, and the filtrate transferred to a separatory funnel. When the mixture is shaken with a five percent hydrochloric acid solution, a heavy gum separates. The gum and acid layers are removed and aqueous sodium hydroxide is added. The resulting oil is extracted into ether. The ether is removed by evaporation and the oil is dissolved in ten milliliters of acetic anhydride. After standing at room temperature overnight, the mixture is poured with stirring onto ice. The solid material which separates is recovered by filtration and washed with water. This solid is recrystallized from methylcyclohexane to obtain four grams of ethyl 2,6-dimethyl-4-acetamidobenzoate (47.5 percent yield) melting between 139 and 140 degrees centigrade.

*Analysis.*—Calc. for $C_{13}H_{17}NO_3$: C, 66.35; H, 7.28; N, 5.94. Found: C, 66.57; H, 6.98; N, 6.06.

*Example 5.—Ethyl 2-methyl-6-ethyl-4-acetamidobenzoate*

Following the procedure described in Example 4 except for the replacement of the azine of ethyl 2,6-dimethyl-4-oxo-2-cyclohexene-1-carboxylate by the azine of ethyl 2-methyl-6-ethyl-4-oxo - 2 - cyclohexene-1-carboxylate (Example 2), ethyl 2-methyl-6-ethyl-4-acetamidobenzoate is obtained.

*Example 6.—Ethyl 2-methyl-6-isopropyl-4-acetamidobenzoate*

Following the procedure described in Example 4 except for the replacement of the azine of ethyl 2,6-dimethyl-4-oxo-2-cyclohexene-1-carboxylate by the azine of ethyl 2-methyl-6-isopropyl-4-oxo-2-cyclohexene - 1 - carboxylate (Example 3), ethyl 2-methyl-6-isopropyl-4-acetamidobenzoate is obtained.

Similarly, on replacing the azine of ethyl 2,6-dimethyl-4-oxo-2-cyclohexene-1-carboxylate in Example 4 by azines of other hindered 4-oxo-2-cyclohexene-1-carboxylic acid esters, other hindered 4-acylamidobenzoates are obtained. Thus, for example, using the azine of ethyl 2-methyl-4-oxo-2-cyclohexene-1-carboxylate as the starting material, ethyl 2-methyl-4-acetamidobenzoate is obtained; ethyl 2-ethyl-3,6-dimethyl-4-acetamidobenzoate is obtained from the azine of ethyl 2-ethyl-3,6-dimethyl-4-oxo-2-cyclohexene-1-carboxylate; benzyl 2,6-diethyl-4-acetamidobenzoate is obtained from the azine of benzyl 2,6-diethyl-4-oxo-2-cyclohexene-1-carboxylate; ethyl 2-methyl-6-(2-furyl)-4-acetamidobenzoate is obtained from the azine of ethyl 2-methyl-6-(2-furyl)-4-oxo-2-cyclohexene-1-carboxylate; ethyl 2-methyl-6-cyclohexyl-4-acetamidobenzoate is obtained from the azine of ethyl 2-methyl - 6 - cyclohexyl - 4 - oxo - 2 - cyclohexene - 1 - carboxylate; ethyl 2 - methyl - 6 - p - methoxyphenethyl - 4-acetamidobenzoate is obtained from the azine of ethyl 2 - methyl - 6 - p - methoxyphenethyl - 4 - oxo - 2 - cyclohexene-1-carboxylate; ethyl 2,6-diphenyl-4-acetamidobenzoate is obtained from the azine of ethyl 2,6-diphenyl-4-oxo-2-cyclohexene-1-carboxylate; and ethyl 2-methyl-3-p-methoxybenzyl-4-acetamidobenzoate is obtained from the azine of ethyl 2-methyl-3-p-methoxybenzyl-4-azine-2-cyclohexene-1-carboxylate.

Similarly, using the procedure set forth in Example 4, except for the replacement of the azine of ethyl 2,6-dimethyl-4-oxo-2-cyclohexene-1-carboxylate by azines of hindered 4-oxo-2-cyclohexene-1-carboxylic acid esters and the use of acylating agents such as propionic anhydride, propionyl chloride, butyric anhydride, butyryl chloride, isobutyric anhydride, caproic anhydride, caproyl chloride, heptanoic anhydride, tosyl chloride, tosyl bromide, benzoyl chloride, benzoyl bromide, and the like, the following hindered 4-acylamidobenzoic acid esters are obtained:

Ethyl 2,6-dimethyl-4-propionamidobenzoate,
Ethyl 2,6-dimethyl-4-butyramidobenzoate,
Ethyl 2,6-dimethyl-4-isobutyramidobenzoate,
Ethyl 2,6-dimethyl-4-tosylamidobenzoate,
Ethyl 2,6-dimethyl-4-benzamidobenzoate,
Ethyl 2,6-dimethyl-4-heptanoamidobenzoate,
Ethyl 2-methyl-4-propionamidobenzoate,
Ethyl 2-ethyl-3,6-dimethyl-4-butyramidobenzoate,
Benzyl 2,6-diethyl-4-isobutyramidobenzoate,
Ethyl 2-methyl-6-(2-furyl)-4-propionamidobenzoate,
Ethyl 2-methyl-6-cyclohexyl-4-caproamidobenzoate,
Ethyl 2 - methyl-6-p-methoxyphenethyl-4-propionamidobenzoate,
Ethyl 2,6-diphenyl-4-propionamidobenzoate,
Ethyl 2 - methyl - 3 - p - methoxybenzyl - 4-propionamidobenzoate.

Similarly, using the procedure set forth in Example 4, other hindered 4-acylamidobenzoates are prepared such as:

Phenethyl 2,6-dimethyl-4-propionamidobenzoate,
Butyl 2-methyl-6-benzyl-4-acetamidobenzoate,
Butyl 2-methyl-6-benzyl-4-propionamidobenzoate,
Ethyl 2-methyl-3-(3,7-dimethyloctyl)-4-acetamidobenzoate,
Ethyl 2-methyl-3-(3,7-dimethyloctyl)-4-butyramidobenzoate,
Ethyl 2-methyl-3-m-methoxyphenethyl-4-acetamidobenzoate,
Ethyl 2,6-diethyl-4-acetamidobenzoate,
Ethyl 2,6-diethyl-4-tosylamidobenzoate,
Ethyl 2-methyl-6-n-hexyl-4-acetamidobenzoate,
Ethyl 2-n-butyl-4-propionamidobenzoate,
Ethyl 2-methyl-6-o-methylbenzyl-4-acetamidobenzoate,
Ethyl 2-methyl-6-p-methoxyphenethyl-4-propionamidobenzoate,
Ethyl 2,6-dimethyl-3-ethyl-4-acetamidobenzoate,
Ethyl 2 - methyl - 3 - benzyl-6-isopropyl-4-butyramidobenzoate,
Ethyl 2-ethyl-4-benzamidobenzoate,
Ethyl 2-methyl-6-p-tolyl-4-acetamidobenzoate,
Ethyl 2,3-dimethyl-4-acetamidobenzoate, and the like.

*Example 7.—2,6-dimethyl-4-acetamidobenzoic acid*

Fifteen grams (0.064) mole) of ethyl 2,6-dimethyl-4-acetamidobenzoate (Example 4) is added to a solution of 35 grams (0.62 mole) of potassium hydroxide in 150 milliliters of ethylene glycol. The mixture is heated to a temperature between 160 and 170 degrees centigrade and maintained within that range for a period of five hours. The solution is allowed to cool, then poured into 200 milliliters of water and the resulting solution is cooled in an ice bath. While stirring, 25 milliliters of acetic anhydride is added to the solution over a 45-minute period. A second 25-milliliter portion of acetic anhydride is added to the mixture followed by the addition of about 25 milliliters of concentrated hydrochloric acid. The solution which is now strongly acidic, is repeatedly extracted with ether to give about two liters of extract and the extract is then dried with anhydrous magnesium sulfate. After drying for eighteen hours, the solution is filtered and concentrated to form a mixture of a solid material and an oil. The mixture of solid material and oil is dissolved in 25 milliliters of five percent sodium hydroxide solution, the resulting solution washed with ether and the basic layer is acidified. A yield of eight grams (60.5 percent) of 2,6-dimethyl-4-acetamidobenzoic acid is obtained in the form of a precipitate. The melting point of this compound, after recrystallization from ethyl acetate, is 214 to 216 degrees centigrade.

*Analysis.*—Calc. for $C_{11}H_{13}NO_3$: C, 63.76; H, 6.32; N, 6.76. Found: C, 63.46; H, 6.27; N, 6.75.

*Example 8.—2-methyl-6-ethyl-4-acetamidobenzoic*

Following the procedure described in Example 7 except for the replacement of ethyl 2,6-dimethyl-4-acetamidobenzoate by ethyl 2-methyl-6-ethyl-4-acetamidobenzoate (Example 5), 2-methyl-6-ethyl-4-acetamidobenzoic acid is obtained (96 percent yield) melting between 203 and 204 degrees centigrade (tube).

*Analysis.*—Calc. for $C_{12}H_{15}NO_3$: C, 65.14; H, 6.83; N, 6.33. Found: C, 65.15; H, 6.68; N, 6.42.

*Example 9.—2-methyl-6-isopropyl-4-acetamidobenzoic acid*

Following the procedure described in Example 7 except for the replacement of ethyl 2,6-dimethyl-4-acetamidobenzoate by ethyl 2-methyl - 6 - isopropyl-4-acetamidobenzoate (Example 6), 2-methyl-6-isopropyl-4-acetamidobenzoic acid is obtained (sixty percent yield) melting between 194 and 197 degrees centigrade (tube).

*Analysis.*—Calc. for $C_{13}H_{17}NO_3$: C, 66.58; H, 6.82; N, 5.99. Found: C, 66.36; H, 7.13; N, 5.95.

Using the procedure described in Example 7 except for the replacement of acetic anhydride by other acylating agents such as, acetyl chloride, acetyl bromide, propionyl chloride, propionic anhydride, butyric anhydride, butyryl chloride, isobutyric anhydride, caproic anhydride, caproyl chloride, heptanoic anhydride, and the like; tosyl chloride (p-toluenesulfonyl chloride), tosyl bromide (p-toluenesulfonyl bromide), benzenesulfonyl chloride, and the like; benzoyl bromide, benzoyl chloride, and the like, other 2,6 - dimethyl-4-acylamidobenzoic acids are obtained. Thus, by using propionic anhydride in the above reaction, 2,6-dimethyl-4-propionamidobenzoic acid is obtained. In a like manner, 2,6-dimethyl - 4 - p-toluenesulfonamidobenzoic acid is obtained by the use of p-toluenesulfonyl chloride; 2,6-dimethyl-4-benzenesulfonamidobenzoic acid is obtained by the use of benzenesulfonyl chloride; and 2,6-dimethyl-4-benzamidobenzoic acid is obtained by the use of benzoyl chloride. Ordinarily, it is preferred to utilize an acylating agent containing not more than seven carbon atoms and more particularly, an acylating agent derived from a lower-aliphatic monocarboxylic acid containing not more than seven carbon atoms such as the anhydrides or acid halides of said lower-aliphatic monocarboxylic acids.

Similarly, on replacing ethyl 2,6-dimethyl-4-acetamidobenzoate in Example 7 by other hindered 4-acylamidobenzoic acid esters, and by the use of an acylating agent such as described supra, other hindered 4-acylamidobenzoic acids are obtained. Thus, for example, by the use of ethyl 2-methyl-4-acetamidobenzoate, 2-methyl-4-acetamidobenzoic acid is obtained; 2-ethyl-3,6-dimethyl-4-propionamidobenzoic acid is obtained by the use of ethyl 2-ethyl-3,6-dimethyl-4-propionamdiobenzoate; 2,6-diethyl-4-acetamidobenzoic acid is obtained by the use of benzyl 2,6-diethyl-4-acetamidobenzoate; 2-methyl-6-(2 - furyl)-4-butyramidobenzoic acid is obtained by the use of ethyl 2-methyl-6-(2-furyl)-4-butyramidobenzoate; 2-methyl-6-p-methoxyphenethyl-4-acetamidobenzoic acid is obtained by the use of ethyl 2-methyl-6-p-methoxyphenethyl-4-acetamidobenzoate; 2,6 - diphenyl-4-acetamidobenzoic acid is obtained by the use of ethyl 2,6-diphenyl - 4-acetamidobenzoate; 2 - methyl-6-cyclohexyl-4-acetamidobenzoic acid is obtained by the use of ethyl 2 - methyl - 6 - cyclohexyl-4-acetamidobenzoate; and 2-methyl-3-p-methoxyphenethyl-4-acetamidobenzoic acid is obtained by the use of ethyl 2 - methyl - 3-p-methoxyphenethyl-4-acetamidobenzoate.

In the same manner, i. e., by replacing ethyl 2,6-dimethyl - 4 - acetamidobenzoate in Example 7 by other hindered 4-acylamidobenzoic acid esters, and by the use of an acylating agent such as described supra, other hindered 4-acylamidobenzoic acids are obtained such as:

2-methyl-6-n-hexyl-4-acetamidobenzoic acid,
2-methyl-6-isopropyl-4-propionamidobenzoic acid,
2 - methyl - 6 - p - methoxyphenethyl - 4 - butyramidobenzoic acid,
2,6-diethyl-4-isobutyramidobenzoic acid,
2-methyl-6-o-methylbenzyl-4-acetamidobenzoic acid,
2-methyl-6-benzyl-4-acetamidobenzoic acid,
2-ethyl-4-acetamidobenzoic acid,
2-n-butyl-4-acetamidobenzoic acid,
2-methyl-6-p-tolyl-4-acetamidobenzoic acid,
2 - methyl - 3 - (3,7 - dimethyloctyl) - 4 - acetamidobenzoic acid,
2,3-dimethyl-4-acetamidobenzoic acid,
2 - methyl - 3 - m - methoxyphenethyl - 4 - acetamidobenzoic acid,
2,6-dimethyl-3-ethyl-4-acetamidobenzeoic acid,
2 - methyl - 3 - benzyl - 6 - isopropyl - 4 acetamidobenzoic acid, and the like.

The deacylation step in Example 7 can be effected without producing any change in other positions on the ring by three alternative procedures such as (1), reacting the hindered 4-acylamidobenzoic acid ester with a dilute alkali for a short period of time, e. g., about four hours, or (2), alcoholysis or (3), ammonolysis, the alcoholysis and ammonolysis procedures being conducted at a temperature higher than 100 degrees centigrade for periods of time varying between ten and 48 hours. By such procedures, hindered 4-aminobenzoic acid esters are obtained such as:

Ethyl 2,6-dimethyl-4-aminobenzoate,
Methyl 2,6-dimethyl-4-aminobenzoate,
Benzyl 2,6-diethyl-4-aminobenzoate,
Ethyl 2-methyl-6-cyclohexyl-4-aminobenzoate,
Ethyl 2,6-diphenyl-4-aminobenzoate,
Ethyl 2-methyl-6-p-methoxyphenethyl-4-aminobenzoate,
Ethyl 2-methyl-6-n-hexyl-4-aminobenzoate,
Ethyl 2-methyl-4-aminobenzoate,
Ethyl 2-methyl-6-(2-furyl)-4-aminobenzoate,
Ethyl 2-ethyl-3,6-dimethyl-4-aminobenzoate,
Ethyl 2-methyl-6-o-methylbenzyl-4-aminobenzoate,
Butyl 2-methyl-6-benzyl-4-aminobenzoate,
Ethyl 2-methyl-6-p-methoxyphenethyl-4-aminobenzoate,
Ethyl 2-methyl-3-p-methoxyphenethyl-4-aminobenzoate,
Ethyl 2-methyl-6-isopropyl-4-aminobenzoate,
Ethyl 2,6-diethyl-4-aminobenzoate,
Phenethyl 2,6-dimethyl-4-aminobenzoate,
Ethyl 2-n-butyl-4-aminobenzoate,
Ethyl 2 - methyl-3-(3,7-dimethyloctyl)-4-aminobenzoate,
Ethyl 2-methyl-3-m-methoxyphenethyl-4-aminobenzoate,
Ethyl 2,6-dimethyl-3-ethyl-4-aminobenzoate,
Ethyl 2 - methyl - 3-benzyl-6-isopropyl-4-aminobenzoate,
Ethyl 2-ethyl-4-aminobenzoate,
Ethyl 2-methyl-6-p-tolyl-4-aminobenzoate,
Ethyl 2,3-dimethyl-4-aminobenzoate, and the like.

The hindered 4-aminobenzoic acid esters thus obtained are hydrolyzed to obtain the corresponding hindered 4-aminobenzoic acids such as:

2,6-dimethyl-4-aminobenzoic acid,
2,6-diethyl-4-aminobenzoic acid,
2-methyl-6-cyclohexyl-4-aminobenzoic acid,
2,6-diphenyl-4-aminobenzoic acid,
2-ethyl-3,6-dimethyl-4-aminobenzoic acid,
2-methyl-6-n-hexyl-4-aminobenzoic acid,
2-methyl-4-aminobenzoic acid,
2-methyl-6-(2-furyl)-4-aminobenzoic acid,
2-methyl-3-p-methoxyphenethyl-4-aminobenzoic acid,
2-methyl-6-o-methylbenzyl-4-aminobenzoic acid,
2-methyl-6-benzyl-4-aminobenzoic acid,
2-methyl-6-p-methoxyphenethyl-4-aminobenzoic acid,
2-methyl-6-isopropyl-4-aminobenzoic acid,
2-n-butyl-4- aminobenzoic acid,
2 - methyl - 3 - benzyl - 6 - isopropyl - 4 - aminobenzoic acid,
2-ethyl-4-aminobenzoic acid,
2-methyl-6-p-tolyl-4-aminobenzoic acid,
2,3-dimethyl-4-aminobenzoic acid,
2 - methyl - 3 - (3,7 - dimethyloctyl) - 4 - aminobenzoic acid,
2 - methyl - 3-m-methoxyphenethyl-4-aminobenzoic acid,
2,6-dimethyl-3-ethyl-4-aminobenzoic acid, and the like.

The hindered 4-aminobenzoic acids thus obtained are then acylated with conventional acylating agents such as anhydrides of lower-aliphatic acids such as acetic anhydride, propionic anhydride, butyric anhydride, and the like, arylsulfonyl halides such as p-toluenesulfonyl chloride, p-toluenesulfonyl bromide, benzenesulfonyl chloride, benzenesulfonyl bromide, and the like, aroyl halides such as benzoyl chloride, benzoyl bromide, and the like, to obtain the corresponding hindered 4-acylamindobenzoic acids.

It is to be understood that the invention is not to be limited to the exact details of operation or exact compounds shown and described herein as obvious modifications and equivalents will be apparent to one skilled in the art. The invention is therefore to be limited only by the scope of the appended claims.

We claim:

1. A process for the preparation of a hindered 4-acylamidobenzoic acid which comprises azinating a hindered 4-oxo-2-cyclohexene-1-carboxylic acid ester to produce an azine of a hindered 4-oxo-2-cyclohexene-1-carboxylic acid ester, aromatizing the resulting azine to form a hindered 4-aminobenzoic acid ester, then hydrolyzing the ester group to produce a hindered 4-aminobenzoic acid and acylating the amino group of the thus produced hindered 4-aminobenzoic acid.

2. A process for the preparation of a hindered 4-acylamidobenzoic acid which comprises azinating a hindered 4-oxo-2-cyclohexene-1-carboxylic acid ester to produce an azine of a hindered 4-oxo-2-cyclohexene-1-carboxylic acid ester, aromatizing the resulting azine to form a hindered 4-aminobenzoic acid ester, acylating the amino group of said acid ester to produce a hindered 4-acylamidobenzoic acid ester, and isolating the hindered 4-acylamidobenzoic acid ester therefrom, hydrolyzing the isolate to the hindered 4-aminobenzoic acid, and acylating the amino group of said acid to form a hindered 4-acylamidobenzoic acid.

3. A process for preparing compounds of the formula:

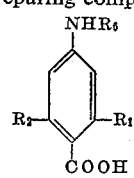

wherein $R_1$ and $R_2$ are lower-alkyl groups and $R_6$ is a lower-alkanoyl group, which comprises azinating a compound of the formula:

wherein $R_1$, $R_2$ and $R_5$ are lower-alkyl groups, to produce the azine of a 2,6-di-lower-alkyl-4-oxo-2-cyclohexene-1-carboxylic acid ester, aromatizing said azine to produce a 2,6-di-lower-alkyl-4-aminobenzoic acid ester, acylating the amino group of said compound to form a 2,6-di-lower-alkyl-4-acylamidobenzoic acid ester, isolating the resulting compound, hydrolyzing the isolate to the corresponding 2,6-di-lower-alkyl-4-aminobenzoic acid and then acylating the amino group of said acid by treating with a member selected from the group consisting of an acid halide and acid anhydride of a lower-aliphatic acid.

4. A process for preparing compounds of the formula:

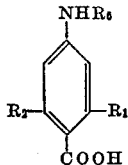

wherein $R_1$ and $R_2$ are lower-alkyl groups and $R_6$ is a lower-alkanoyl group, which comprises azinating a compound of the formula:

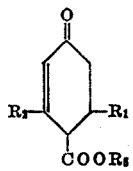

wherein $R_1$, $R_2$ and $R_5$ are lower-alkyl, by reacting with a member selected from the group consisting of hydrazine, hydrazine hydrate, and hydrazine acid salts to produce the azine of a 2,6-di-lower-alkyl-4-oxo-2-cyclohexene-1-carboxylic acid ester, aromatizing said azine by treating with a suspended palladium catalyst to produce a 2,6-di-lower-alkyl-4-aminobenzoic acid ester, acylating the amino group of said compound to obtain a 2,6-di-lower-alkyl-4-acylamidobenzoic acid ester, isolating said compound, hydrolyzing the isolate to the corresponding 2,6-di-lower-alkyl-4-aminobenzoic acid by treating with an alkali and then acylating the amino group of said acid by treating with a member selected from the group consisting of an acid halide and acid anhydride of a lower-aliphatic acid.

5. A process for the preparation of 2,6-dimethyl-4-acetamidobenzoic acid which comprises azinating ethyl 2,6-dimethyl-4-oxo-2-cyclohexene-1-carboxylate by reacting with hydrazine hydrate to obtain the azine of ethyl 2,6-dimethyl-4-oxo-2-cyclohexene-1-carboxylate, aromatizing said azine by treating with a suspended palladium catalyst, to produce ethyl 2,6-dimethyl-4-aminobenzoate, acetylating said compound to form ethyl 2,6-dimethyl-4-acetamido benzoate, isolating said compound, hydrolyzing the isolate by treatment with an alkali to obtain 2,6-dimethyl-4-aminobenzoic acid and then acetylating the amino group of said compound.

6. A process for the preparation of 2-methyl-6-ethyl-4-acetamidobenzoic acid which comprises azinating ethyl 2-methyl-6-ethyl-4-oxo-2-cyclohexene-1-carboxylate by reacting with hydrazine hydrate to obtain the azine of ethyl 2-methyl-6-ethyl-4-oxo-2-carboxylate, aromatizing said azine by treating with a suspended palladium catalyst to produce ethyl 2-methyl-6-ethyl-4-aminobenzoate, acetylating said compound to form ethyl 2-methyl-6-ethyl-4-acetamidobenzoate, isolating said compound, hydrolyzing the isolate by treatment with an alkali to obtain 2-methyl-6-ethyl-4-aminobenzoic acid and then acetylating the amino group of said compound.

7. A process for the preparation of 2-methyl-6-isopropyl-4-acetamidobenzoic acid which comprises azinating ethyl 2-methyl-6-isopropyl-4-oxo-2-cyclohexene-1-carboxylate by reacting with hydrazine hydrate to obtain the azine of ethyl 2-methyl-6-isopropyl-4-oxo-2-cyclohexene-1-carboxylate, aromatizing said azine by treating with a suspended palladium catalyst to produce ethyl 2-methyl-6-isopropyl-4-aminobenzoate, acetylating said compound to form ethyl-2-methyl-6-isopropyl-4-acetamidobenzoate, isolating said compound, hydrolyzing the isolate by treatment with an alkali to obtain 2-methyl-6-isopropyl-4-aminobenzoic acid and then acetylating the amino group of said compound.

No references cited.